United States Patent [19]

Handforth

[11] 4,402,262
[45] Sep. 6, 1983

[54] PRINTING PROCESS AND PRINTING COMPOSITIONS

[75] Inventor: John A. Handforth, Macclesfield, England

[73] Assignee: Imperial Chemical Industries PLC, London, England

[21] Appl. No.: 273,182

[22] Filed: Jun. 12, 1981

[30] Foreign Application Priority Data

Jun. 23, 1980 [GB] United Kingdom ................. 8020489

[51] Int. Cl.$^3$ ............................................. B41M 1/12
[52] U.S. Cl. ................................... 101/129; 101/170; 101/426; 106/20; 106/23; 260/DIG. 38; 524/17; 524/35; 524/52; 524/77; 524/507; 524/513; 524/522; 524/527; 427/261; 427/287; 427/288
[58] Field of Search ............... 260/29.6 NR, 29.2 TN, 260/29.2 E, DIG. 38; 427/261, 287, 288; 101/129, 170, 426; 524/507, 513, 522, 527, 17, 524/35, 52, 77

[56] References Cited

U.S. PATENT DOCUMENTS 3,479,198  11/1969  Barth ................................... 428/207

FOREIGN PATENT DOCUMENTS 1417763  12/1975  United Kingdom .

*Primary Examiner*—Theodore E. Pertilla
*Attorney, Agent, or Firm*—Cushman, Darby & Cushman

[57] ABSTRACT

Aqueous compositions, suitable for printing, are described which have a high volume solids content. They comprise primary polymer particles and a secondary polymer which provides temporary adherence of the particles to a substrate before the primary polymer is fused by a heating step, in a printing process, in order to cause permanent adherence. There are advantages over the use of organic solvent-based and other aqueous compositions, such as easier cleaning, low toxicity/fire hazard and lower cost.

3 Claims, No Drawings

PRINTING PROCESS AND PRINTING COMPOSITIONS

This invention relates to a process of printing onto a substrate and to printing compositions suitable for use in this and other processes.

The use of water-based printing inks in processes for printing onto a variety of substrates, including polymeric substrates, is well known. Whilst wholly organic solvent-based ink compositions have been used to good effect on polymeric substrates, there has been a trend towards the use of water-based inks due to the increasing cost of organic solvents and the health and fire hazards associated with many of these solvents. Belgian Patent No. 857,415, for example, describes a process of printing onto a vinyl plastics material in which a vinyl plastics substrate is printed with an aqueous ink composition comprising 10–30% by weight, based on the weight of the composition, of an emulsion-type polyvinyl chloride resin; 40–50% by weight of a water-soluble binder, such as an acrylic resin; 15–40% by weight of a pigment which does not migrate into the plasticiser of the substrate; 25–35% by weight of water; and 10% by weight of alcohol. The printed substrate is subsequently coated with a compatible plastisol, for example of polyvinyl chloride, which is then gelled by heating to a temperature in the range 160°–200° C. The introduction of polyvinyl chloride into the printing ink composition is said "to create the indispensible bond for perfect adhesion between the printed substrate and the surface film of plastisol". However, the disadvantages of this process are that:

(a) it involves a step, additional to those steps of printing and subsequent fusing of the polyvinyl chloride in the aqueous ink composition, for applying the plastisol film (which is also subsequently fused) over the whole surface of the substrate, (b) plastisol is applied to areas of the substrate where it may play no useful part and is therefore redundant, (c) there is an extra cost for the redundant plastisol film, and (d) extra energy is needed to fuse the plastisol.

We have now found that substrates, and particularly polymeric substrates, can be printed with a specified water-borne composition in a single printing step, i.e. without a subsequent overcoating step, the composition comprising, with a minimum of water, all of the components which are required to ensure satisfactory adhesion of the print to the substrate both before and after a subsequent heating step. In this subsequent heating step the print is integrated and made to adhere firmly to the substrate. This new printing process overcomes the disadvantages of the prior process described above and provides a combination of advantages not present in the prior processes, which include:

(1) the ease of cleaning printing and associated equipment with water;

(2) a reduction in energy consumption during drying due to the high non-volatile solids content of the composition, giving a drying rate which is comparable to that of a conventional solvent-based composition;

(3) the advantages of working with water and mixtures of water and water-miscible solvents, which include lower cost and toxicity, reduced fire hazard—which may significantly reduce capital costs of printing installation, and reduced effluent and atmospheric pollution;

(4) quick drying on non-absorbent substrates due to the low level of water in the composition which means that operating speeds on existing or un-modified printing machines, i.e. those originally used for solvent based compositions, are considerably higher than for the processing of water-borne systems previously known.

According to the present invention, we provide a process of printing onto a substrate, which comprises the steps:

(a) taking an aqueous printing composition which comprises (i) 30–70% by volume, based on the total volume of the composition, of particles of a primary polymer (A) having a minimum film-forming temperature of not less than 25° C.;

(ii) 1.5–33% by weight, based on the weight of the primary polymer (A), of a secondary polymer (B) which is present as an aqueous solution or as a dipsersion in which the disperse particles have a minimum filmforming temperature less than 25° C.;

(iii) 70–30% by volume, based on the total volume of the composition, of an aqueous phase comprising water or a mixture of water and a water-miscible organic solvent; and (iv) optionally, a pigment or other colourant;

(b) applying the aqueous composition to a substrate by a printing process at a temperature lower than the minimum film-forming temperature of the primary polymer (A) and greater than the minimum film-forming temperature of the secondary polymer (B) when (B) is present as a dispersion; and (c) thereafter raising the temperature of the printed substrate to a temperature at least equal to the minimum film-forming temperature of the primary polymer (A).

The invention also provides an aqueous composition suitable for use in the above printing process or in other processes which comprises:

(i) 30–70% by volume, based on the total volume of the composition of particles of a primary polymer (A) having a minimum film-forming temperature of not less than 25° C.;

(ii) 1.5–33% by weight, based on the weight of the primary polymer (A), of a secondary polymer (B) which is present as an aqueous solution or as a dispersion in which the disperse particles have a minimum film-forming temperature of less than 25° C.;

(iii) 70–30% by volume, based on the total volume of the composition, of an aqueous phase comprising water or a mixture of water and a water-miscible organic solvent; and (iv) optionally, a pigment or other colourant.

The invention is particularly suitable for printing onto non-porous substrates including polymeric substrates.

The process may comprise other features and the composition may comprise other ingredients as discussed below. The use of these features and ingredients and the selection of suitable primary and secondary polymers will depend largely on variable factors such as the nature of the substrate to be printed, the ambient conditions, for example room temperature, and the properties required of the print. In general the process step (b) will be conducted at ambient temperature, although in certain circumstances such as metal coil coating and where very low ink viscosities are required, elevated ink temperatures may be used (for example a rise in temperature from ambient to 50° C. may halve the ink viscosity), provided that the film forming temperature of the primary polymer (A) is not exceeded.

Broadly the function of the secondary polymer (B) is to cause at least temporary adherence of the solid content of the aqueous composition to the substrate until the particles of the primary polymer (A) have been coalesced or consolidated in the subsequent heating step. The secondary polymer (B) may also serve other purposes, for example as a pigment and/or a polymer dispersant, rheology modifier, surface active agent, drying rate control additive, protective colloid, or adhesion promoter.

Preferably polymer (B) contains groups which promote its solubility or dispersibility in water. However, the proportion of this polymer is kept to a minimum in order to minimise the adverse effect which it might have on the subsequent resistance of the final print to aqueous detergents, soaps, etc.

There may be present more than one polymer which satisfies the definition of secondary polymer (B), for example a second polymer which is water dispersible may serve principally, for example, as a pigment or polymer dispersant in the composition.

Broadly the function of the primary polymer (A) is to cause permanent adherence of the print to the substrate after the printed substrate has been heated to a temperature of not less than 25° C., and preferably not less than 35° C., the polymer (A) having a minimum film-forming temperature of not less than these preferred respective temperatures. Thus (A) is preferably compatible with the substrate, particularly when this is a polymeric substrate.

In general the primary polymer (A) will be insoluble in water and will comprise a major proportion of the polymer content of the aqueous composition, such that the composition has a high solids content and that the primary polymer (A) has a minimum effect on the rheology of the composition. The primary polymer (A) will be present in the form of a particulate dispersion, or there may be a mixture of polymers in the form of a particulate dispersion.

Suitable substrates to be printed include those which may be classified as being (a) sensitive to relatively low temperature (e.g. 80° C.) for example those comprised of polyethylene and polypropylene, and (b) insensitive even to relatively high temperature treatments (e.g. 120° C. ) for example those comprised of polyesters, polyamides, regenerated cellulose, polyvinyl chloride (plasticised and unplasticised), paper, metal foils and sheets etc.

Clearly it is necessary to choose combinations of primary and secondary polymer which have properties appropriate to the substrate and to the conditions for example temperature, of application.

Suitable polymers for use as the secondary polymer (B) include for example, alkyd resins, acrylic resins, polyurethane-containing resins, shellacs, modified celluloses, starches and proteins, and hydrolised polyvinyl acetates. Preferably the molecular weight is not usually greater than 20,000.

Polymer (B) should always form a film at ambient temperatures, for example in the range $-15°$ to $+35°$ C. after the removal, for example by evaporation, of water or a mixture of water and organic solvent. For ease of cleaning equipment, only polymer (B) should form a film at the temperature found at the point of application of the aqueous composition to the substrate. Preferably the minimum film-forming temperature of (B) is less than 15° C.

Preferably, the secondary polymer (B) contains a sufficient proportion of hydrophilic groups, for example carboxyl, hydroxyl, or amino groups, that it is soluble in water, optionally in the presence of base or acid; although substantially water-insoluble dispersed particles of polymer (B) may also be used. Suitable secondary polymers for use on both temperature-sensitive and temperature-insensitive substrates, include water-soluble alkyds, acrylic polymers and polyurethane-containing polymers. Preferably the polymer has an acid value greater than 30, more preferably greater than 45 mg KOH/g and not usually greater than 150 mg KOH/g.

When the secondary polymer (B) is to behave also as a dispersant for the primary polymer (A) and/or for the pigment, the secondary polymer will be chosen with this in mind. Suitable secondary polymers (B) which also behave as good pigment and polymer dispersants include the polyurethane-containing polymers disclosed in our pending British Patent Application No. 2,046,770A.

Of the total polymer present in the aqueous composition, the secondary polymer (B) preferably comprises 0.5%–20% by weight, more preferably 1.0–15% by weight of the polymer in the composition.

The primary polymer (A) is present in the aqueous printing composition in particulate form in a proportion of from 30–70% by volume, preferably 40–57% by volume, more preferably greater than 45% by volume, of the composition. Since it is desired that the aqueous dispersion contains the minimum amount of water, the primary polymer (A) should have as little effect as possible on the viscosity of the continuous phase. Preferably the secondary polymer (B) is present in a proportion of 3–20%, more preferably 12–20% by weight based on the weight of polymer (A).

The rheology of the composition may be altered to give desired or desirable characteristics, such as enhanced yield value, or reduced sedimentation, by altering the concentration or type of polymer (B), or by the use of other additives well known to those skilled in the art.

The choice of primary polymer (A) is largely determined by the nature of the substrate to be printed. Where the substrate is polymeric, comprising for example, a polyester, regenerated cellulose or polyvinyl chloride (plasticised and unplasticised), or is capable of withstanding high temperatures, for example foils or sheets of metal or paper, the primary polymer (A) may comprise vinyl chloride homopolymer or copolymer (plasticised and unplasticised) whether added as a dry powder or an emulsion or latex; emulsions of vinylidene chloride homopolymer or copolymer; emulsions of methyl methacrylate homopolymer and copolymer; and emulsions of vinyl acetate homopolymer and copolymer. Depending on the nature of the substrate and the availability of equipment to perform the subsequent heating step, the minimum film-forming temperature of primary polymer (A) may be up to 200° C. or even higher.

When the substrate is comprised of a temperaturesensitive substance, such as polyethylene or polypropylene, the minimum film-forming temperature of the primary polymer (A) should be in the range 35°–120° C., and (A) may be, e.g. a copolymer or vinyl chloride, vinylidene chloride, vinyl acetate or acrylic monomer or other comonomers used to promote adhesion, for example acrylonitrile or glycidyl methacrylate.

Preferably the polymer (A) is introduced into the composition as a powder substantially free from water in order to enable control of the total water content of the composition.

Preferably the major proportion of the powder particles of polymer (A) are of diameter less than 25 microns. More preferably at least 99% of the particles are of diameter less than 25 microns.

The choice of primary polymer (A) is also determined by its compatibility with and adhesion to the substrate when coalesced. As discussed below, these characteristics may be improved by suitable pretreatment of the substrate.

The primary polymer (A) is not necessarily compatible with secondary polymer (B) but the coalescence of secondary polymer (B) at ambient temperature should not interfere with the stability of the primary polymer (A) at the printing stage in order that clean up of equipment is not impaired.

Preferably there is a difference of at least 10° C. between the temperature at which the aqueous composition is applied to the substrate (i.e. the temperature at which a film of a dispersion of polymer (B) is formed) and the minimum film-forming temperature of polymer (A).

The composition has a high volume dispersed polymer content, preferably greater than 40%, more preferably 45% and still more preferably 48%, by volume of the total composition, in order that only a small amount of the aqueous phase has to be evaporated before the print becomes immobile. Preferably the aqueous phase comprises 60-43% by volume based on the total volume, preferably less than 55%.

The aqueous composition may contain liquids other than water, for example alkanols such as isopropanol, n-propanol, iso-butanol, and water-soluble ketones. A proportion of an organic liquid such as isopropanol is useful to lower the surface tension at the substrate—dispersion in terface, to regulate the rate of drying and to reduce foaming tendencies. The aqueous composition may contain pigment or other colourants such as dyestuff. In such a case the aqueous composition may be termed an ink. Suitable pigments include phthalocyanine derivatives, azo derivatives, and metal oxides.

Other constituents of the composition may include for example inert fillers such as clays, ground $CaCO_3$ etc., antifoaming additives, antisettling additives such as bentones, and antiblocking additives such as micronised waxes. A polymeric filler may also be present, for example a polymer which has a minimum film-forming temperature greater than the temperature at which polymer (A) is consolidated.

The process of this invention is chiefly useful in those printing processes which require a liquid ink, for example rotary gravure, flexography, flat bed screen and rotary screen printing. Whilst the printing compositions of this invention find particular application in the present process their use is not limited to this process. They are particularly useful in high speed printing processes where fast drying is desired in that they contain a low level of water and a low leverl of volatile organic solvent. Preferably in these other applications the polymer (B) is water-soluble and is preferably present in an amount of 12-20% by weight based on the weight of polymer (A).

The aqueous composition for use in the present printing process may be satisfactorily prepared by adding a pre-prepared solution of secondary polymer (B) to the polymer (A) and other dry powder ingredients which are held in a ball mill in the required amounts, and milling is performed for sufficient time to remove agglomerates and produce a composition of smooth lump-free consistency. Pigment predispersed in secondary polymer (B) is then stirred in if a coloured ink is required. If primary polymer (A) is in the form of an emulsion, simple stirringin of secondary polymer (B) with other pre-dispersed ingredients will suffice.

In cases where the substrate presents particularly difficult adhesional problems, for example polyethylene, polypropylene, aluminum foil, it may be necessary to provide a suitable pretreatment of the substrate to obtain the best print adhesion. Such pretreatments include, the Corona discharge treatment of polymeric substrates such as polyethylene and polypropylene; and the application of primer coats or varnishes of polymer or copolymer, for example the application of polyvinyl dichloride or polyvinyl chloride copolymers to polymeric substrates and aluminium foil.

Whilst performing the essential steps (a), (b) and (c) of the present process there may be performed also other steps depending for example upon the type of printing process which is used. In general, after carrying out the printing step (b), where (b) may also represent two or more steps in which print is applied (for example prints of different colour), it is usually desirable that the print dries quickly, for example to avoid marking off in a rotary printing process, and this is one advantage of the present invention. In one embodiment, there is no subsequent step in which a layer of polymer (A) is applied over a previously applied print. The subsequent heating step (c) may be combined with another step such as embossing. The application of second or further areas of print may be applied, provided that the previously applied print is substantially dry, before or after the heating step (c). With respect to screen printing it may be desired to stack a number of separate dry prints before they are all loaded into an oven for step (c).

The invention is illustrated by the following Examples:

EXAMPLE 1

This Example illustrates the preparation and use, according to the invention, of printing compositions, in which the primary polymer (A) was polyvinylchloride and the secondary polymer (B) was a water-soluble polyurethane-containing alkyd resin. As the volume solids of the polyvinyl chloride in the composition was increased from (a) to (d) so there was a corresponding increase in the rate of printing by rotary gravure which was possible without "marking-off" after an initial drying stage.

(a) A rotary gravure ink was made up to the following composition:

| | parts | |
|---|---|---|
| | % volume | % weight |
| "Corvic" P72/755 (a paste grade of polyvinylchloride of 100% solids content available from I.C.I.; "Corvic" is a Registered Trade Mark.) | 30.8 | 38.2 |
| Polyurethane-containing alkyd resin (60% non-volatile solids content and | | |

|  | parts | |
|---|---|---|
|  | % volume | % weight |
| prepared according to British Patent Application 7911903 filed 5th April 1979), solution in water neutralised to pH 8.5-9.0 with dimethylaminoethanol. | 18.3 | 18.8 |
| Water | 40.9 | 36.1 |
| Isopropanol | 10 | 6.9 |
|  | 100.0 | 100.0 |

"Corvic" P72/755 had a minimum film-forming temperature (MFFT) of about 180° C. and the polyurethane-containing alkyd resin had an acid value of 50 mg KOH/g.

9.39 kilogrammes of the above formulation was ball milled overnight in the presence of 0.1% by weight of a defoaming agent commercially available as "Nopco Foamaster" NXZ. The above composition was pigmented with 2% by weight based on the total weight of the composition of a dispersion of phthalocyanine blue pigment of the following composition:

|  | parts % weight |
|---|---|
| Phthalocyanine blue pigment (commercially available as "Irgalite" Blue BCA from Ciba-Geigy); "Irgalite" is a Registered Trade Mark. | 13 |
| Polyurethane-containing alkyd as described above neutralised to pH 8.5-9.0 with dimethylaminoethanol (25% non-volatile solids (NVS) in water). | 39 |
| Water | 48 |
|  | 100 | which had been previously prepared by ball milling. The pigmented ink had a "No. 4. Ford Cup" viscosity of 23 seconds.

Printing of the ink was done on a "Merkur" 1850 gravure printing machine using a gravure roller of cell screen size 120 cells/linear inch. Cell depth was graduated in three stages from full tone, 0.0018" deep, to 66% full tone to 33% full tone. Initial drying of the ink was by high velocity air jets heated to an indicated temperature of 105° C. The substrate was plasticised PVC coated onto a paper base.

It was possible to print the pigmented ink at speeds up to 35-40 meters/minute without it marking-off onto the web supporting rollers of the printing machine. The dried print had perfectly satisfactory dry rub resistance.

At the end of the printing run, the gravure cylinder and associated equipment was found to clean up easily with soapy warm water and gentle scrubbing, and the environment surrounding the printing machine was not unpleasant to work in, which was in complete contrast to conditions during printing and cleaning using solvents and solvent based inks.

The printed substrate was then subjected to a temperature of 180° C.-220° C. during a subsequent embossing operation, when the primary polymer, ("Corvic" P72/755) was consolidated and caused to firmly adhere to the substrate. After this process the print had excellent wet and dry rub resistance, and was found to pass the ∓scrubbability test" of the International Wallpaper Manufacturers Association. In this test a 600 g. weighted scrubbing brush was reciprocated 60 times within 2 minutes over an area of the surface of the printed substrate upon which was spread 30 ml. of a 2% soft soap solution in water in which was dispersed 4 g. of white bauxite (180 mesh particle size). The printed substrate passed this test if no damage to the print was discernible when viewed at a distance of 1 meter.

(b) A printing ink composition was made up as follows:

|  | parts | |
|---|---|---|
|  | % volume | % weight |
| "Corvic" P72/755 (as used in Example 1(a).) | 38.5 | 48.2 |
| Polyurethane-containing alkyd (60% NVS) neutralised with volatile amine to pH 8.5-9.0 (as used in Example 1(a).) | 10.9 | 10.8 |
| Water | 29.0 | 25.9 |
| Isopropanol | 21.6 | 15.1 |
|  | 100.0 | 100.0 |

The unpigmented base had a No. 4. Ford Cup viscosity of 31 seconds. Pigmentation and the antifoam addition were as in Example 1(a).

During printing, using the same conditions as Example 1(a), no marking-off of the ink onto the backing roller was experienced at speeds up to 50 meter/minute. Cleaning of equipment and the durability of the print were up to the standards of Example 1(a).

(c) A printing ink composition was made up as follows:

|  | parts | |
|---|---|---|
|  | % volume | % weight |
| "Corvic" P72/755 (as used in Example 1(a).) | 46.0 | 57.4 |
| Polyurethane-containing alkyd, (5% NVS in water:isopropanol: 2:1 by weight) neutralised to pH 8.5-9.0 by volatile amine (as used in Example 1(a).) | 54.0 | 42.6 |
|  | 100.0 | 100.0 |

The pigmentation and the antifoam addition were as in Example 1(a). The pigmented ink had a No. 4. Ford Cup viscosity of 28 seconds.

Printing under the conditions of Example 1(a) gave no marking-off onto the backing roller at speeds up to 60 meters/minute. Once more cleaning was easy and the print abrasion resistance, when heated to 180°-220° C. was excellent.

(d) A pigmented ink of formulation:

|  | parts | |
|---|---|---|
|  | % volume | % weight |
| "Corvic" P72/755 (as in Example 1(a).) | 50 | 56 |
| Polyurethane-containing alkyd (5% NVS as in Example 1(c).) | 50 | 44 |
|  | 100 | 100 | was prepared as in Example 1(a) and pigmented with the addition of 2% by weight of the following:

|  | parts % weight |
|---|---|
| Polyurethane-containing alkyd, (25% NVS, neutralised as in |  |

|  | parts<br>% weight |
|---|---|
| Example 1(a).) | 59 |
| "Merlin" A (Pearlescent pigment available from duPont) | 40 |
| Defoaming agent | 1 |
|  | 100 |

The resultant pearlescent, or light-reflecting effect was printed onto a plasticised PVC substrate laminated to paper, using a 150 cells per linear inch screen gravure lacquer roller, at 100 meters/minute and temperature as in Example 1(a) without making-off onto the backing rollers. Easy clean-up and excellent lacquer abrasion resistance after heating to 180°–220° C. was achieved.

EXAMPLE 2

This Example illustrates the preparation and use according to the invention of printing compositions in which the primary polymer (A) was polyvinylchloride and the secondary polymer (B) was an acrylic copolymer containing carboxyl groups. The Example also illustrates the use of a further polymer which serves principally as a pigment dispersant, the use of different pigments and the use of different substrates.

(a) A rotary gravure printing ink was make up as in Example 1(a) except that the formulation had the following proportions:

|  | parts | |
|---|---|---|
|  | % volume | % weight |
| "Corvic" P72/755 (as used in Example 1(a).) | 37.1 | 46.8 |
| "Surcol" 860 (14.7% by weight solution in water:isopropanol = :2:1 by weight), neutralised by volatile amine to pH 8.5–9.0 ("Surcol" 860 is an acrylic copolymer containing carboxyl groups available from Allied Colloids Limited). | 49.9 | 42.5 |
| Water | 7.9 | 7.1 |
| Isopropanol | 5.1 | 3.6 |
|  | 100.0 | 100.0 |

"Surcol" 860 had an acid value of 62–66 mg KOH/g. The pigmentation and antifoam addition were as in Example 1(a). The pigmented ink had a No. 4 Ford Cup viscosity of 30 seconds.

On printing, using the same conditions as in Example 1(a) there was only slight marking-off onto a backing roller at a printing speed of 80 meters/minute.

Again, cleaning down of the printing equipment was easy and pleasant and after the subsequent heating step at 180°–220° C., the print passed the 'scrubbability test'

(b) A printing ink was made up as in Example 1(a) to the formulation:

|  | parts | |
|---|---|---|
|  | % volume | % weight |
| "Corvic" P72/755 (as used in Example 1(a).) | 43.9 | 52.4 |
| "Surcol" 860 (10% NVS, 2:1 by weight water:isopropanol,) neutralised with volatile amine to pH 8.5–9.0, as used in Example 2(a). | 56.1 | 47.6 |
|  | 100.0 | 100.0 | and was pigmented with the addition of 10% by weight based on the total weight of the composition of the following pigment dispersion:

|  | parts<br>% weight |
|---|---|
| "Monolite" Yellow 10GE (available from I.C.I. Ltd; "Monolite" is a Registered Trade Mark. | 22 |
| Polyurethane-containing alkyd, 25% NVS by weight neutralised to pH 8.5–9.0 by volatile amine, as used in Example 1(a) | 30 |
| Water | 48 |
|  | 100 | yielding a yellow ink of No. 4 Ford Cup viscosity = 40 seconds.

When printed under the same conditions as Example 1(a) marking-off onto the backing roller did not occur until printing speeds exceeded 80 meters/minute. Cleaning of equipment and print abrasion resistance was up to the standards of proceeding examples.

(c) A printing ink of formulation:

|  | parts | |
|---|---|---|
|  | % volume | % weight |
| "Corvic" P72/755 (as used in Example 1(a).) | 47.2 | 55.1 |
| "Surcol" 860, (21% NVS by weight solution in 2:1 water:isopropanol) neutralised with volatile amine to pH 8.5–9.0, as used in Example 2(a) | 47.9 | 39.9 |
| Anti-foam agent | 0.2 | 0.2 |
| "Monastral" Blue BXG HD aqueous paste, commercially available from I.C.I. ("Monastral" is a Registered Trade Mark.) | 4.7 | 4.8 |
|  | 100.0 | 100.0 | was made by ball milling, and the pigmented ink applied to the following substrates by means of a fine coating bar simulating application of a low coating weight printed film by gravure or flexo printing:

Plasticised PVC/paper laminate;
Cellophane MXXT/A (cellulose film); and
"Melinex" type S (polyethylene terephthalate film).
("Melinex" is a Registered Trade Mark.)

The printed substrates were allowed to dry at room temperature. The substrates were then heated to 200° C. in an oven for 30 seconds, and on cooling the wet and dry rub resistance was found to be excellent.

(d) A printing ink was prepared to the following composition:

|  | parts | |
|---|---|---|
|  | % volume | % weight |
| "Corvic" P72/755 (as used in Example 1(a).) | 52.0 | 60.4 |
| "Surcol" 860 (5% non-volatile solids in 2:1 water:isopropanol) neutralised with volatile amine to pH 8.5–9.0. | 48.0 | 39.6 |

-continued

| | parts | |
|---|---|---|
| | % volume | % weight |
| | 100.0 | 100.0 |

Pigmentation and defoaming agent was as in Example 1(a). A printing speed of greater than 80 meters/minute was achieved before marking-off occurred. After heating to 180°–220° C. the printed substrate passed the "scrubbability test".

EXAMPLE 3

This Example illustrates the printing of a metal substrate.

A blue ink prepared according to the formulation shown in Example 1(b) was printed under the conditions of Example 1(a) onto aluminium foil primed with a lacquer of "Vinylite" VMCH, (a commercially available copolymer of vinyl chloride/vinyl acetate comprising a minor proportion of carboxyl groups), which was laminated to paper, at a speed of 40 meters/minute. Good dry adhesion of the dried print to the aluminium foil was found and on heating the print to temperatures greater than 180° C. both the wet and dry rub resistance of the print was found to be excellent.

Once more easy clean-up of printing equipment was found.

EXAMPLE 4

This Example illustrates the sequential overprinting of one ink by another before final consolidation of polymer (A) at high temperature.

The blue ink from Example 1(b) was overprinted by the yellow ink from Example 2(b) using a gravure roller of cell screen size 135 cells/linear inch with continuous tone graduations, i.e. cell depth varied continuously from circa 0.0018 inches to circa 0.00018 inch. No marking-off of the previously applied blue ink was found when the yellow ink was printed down to cover the blue ink. On subsequent heating to 180°–220° C. excellent wet and dry rub resistance was found.

EXAMPLE 5

This Example illustrates the use of a different grade of polyvinylchloride as polymer (A) and a water-soluble alkyd resin as polymer (B).

A pigmented ink of formulation:

| | parts | |
|---|---|---|
| | % volume | % weight |
| "Corvic" P75/578 (MFFT approximately 180° C.) | 46 | 57 |
| Water soluble alkyd,* (5% NVS by weight in water:isopropanol of 2:1 by weight) neutralised with volatile amine to pH 8.5–9.0 | 54 | 43 |
| (Acid value 60 mg KOH/g) | 100 | 100 |

(*a trimethylolpropane/isophthalic acid/fatty acid alkyd with excess hydroxyl groups esterified with trimellitic anhydride; as described in "Amoco" sales literature).

was made as in Example 1(a). It was pigmented with a pigment dispersion of formulation:

| | parts |
|---|---|
| | % weight |
| Phthalocyanine blue ("Fastona" Blue GR64) | 13 |
| Water soluble alkyd* 25% NVS in water neutralised to pH 8.5–9.0 with volatile amine | 41 |
| Water | 31 |
| Isopropanol | 15 |
| | 100 |

The viscosity of the pigmented ink was 40 seconds No. 4 Ford Cup. Printing was carried out as in Example 1(a). Marking-off onto the backing roller did not occur until speeds greater than 40 meters/minute were used.

EXAMPLE 6

This Example illustrates the use of a mixture of a polyvinylchloride copolymer (as the primary polymer A and of a small proportion of a polyvinylchloride homopolymer (as a filler).

A printing ink had the following composition:

| | parts | |
|---|---|---|
| | % volume | % weight |
| "Lutofan" 200D, a polyvinyl chloride copolymer, having a minimum film forming temperature of 35° C. and 50% NVS, (available from BASF). | 55.8 | 57.4 |
| "Corvic" P72/755 paste grade PVC polymer (as used in Example 1(a).) | 5.1 | 6.6 |
| Polyurethane-containing alkyd, neutralised with volatile amine to pH 8.5–9.0; 60% NVS | 15.5 | 16.6 |
| Blue pigment paste (as used in Example 1(a).) | 1.9 | 2.0 |
| Defoaming agent (as used in Example 1(a).) | 0.2 | 0.2 |
| Water | 12.6 | 10.8 |
| Isopropanol | 8.9 | 6.4 |
| | 100.0 | 100.0 |

The ink was made by ball milling all the ingredients overnight. The pigmented ink was applied to the following substrates - "Propafilm" C28, "Melinex" S and "Melinex" 813. These films had been treated to improve ink adhesion. Good wet-out of the ink film on the substrate occurred. The printed samples were dried at room temperature and then post treated by heating to 50° C. in a circulating air oven. No dimensional distortion of the plastic substrate was found and the print had good adhesion to the surface.

EXAMPLE 7

This Example illustrates the preparation and use, according to the invention, of screen printing inks which contained as primary polymer (A) a polyvinylchloride copolymer. The inks dried over a period of 3–5 minutes at room temperature, depending on the thickness of the print.

(a) A screen printing ink was formulated as follows:

| | parts | |
|---|---|---|
| | % volume | % weight |
| "Lutofan" 200D (66% NVS solids) | 74.4 | 76.7 |
| Polyurethane-containing alkyd (as used in Example 1(a).) | | |

-continued

|  | parts | |
|---|---|---|
|  | % volume | % weight |
| % NVS neutralised with volatile amine | 14.1 | 12.7 |
| Water | 10.6 | 9.6 |
| Phthalocyanine blue pigment paste as used in Example 1(a) | 0.9 | 1.0 |
|  | 100.0 | 100.0 |

The ink was made by ball milling the constituents together overnight.

The viscosity of the ink was increased to give a strongly thixotropic composition, by the addition of 2% by weight, based on the weight of the polymer present in the "Lutofan" 200D, of "Viscalex" HN30 (a 30% NVS emulsion of an acrylic copolymer containing carboxyl groups, make alkaline with the addition of volatile amine).

The ink was printed onto "Propafilm" C28 (a surface-treated packaging grade of polypropylene film available from I.C.I.; "Propafilm" is a Registered Trade Mark, and onto a plasticised PVC coated on a paper substrate, using a nylon screen of 12 lines per linear inch and a rubber squeegee. The ink was allowed to air dry, becoming tack-free and handleable after 3–4 minutes and was mar-resistant. The PVC sheet was then heated to 200° C. for 30 seconds, and the "Propafilm" C28 film was heated to 60° C. for 5 minutes.

The prints on both polymeric substrates adhered strongly and passed an adhesion test in which adhesive tape was pressed over the print and then pulled away. No significant amount of the print was removed. Wash up of equipment with soapy water was quick and easy.

(b) A screen printing ink was formulated as follows:

|  | parts | |
|---|---|---|
|  | % volume | % weight |
| "Lutofan" 200D (50% NVS by weight) | 94.7 | 94.4 |
| "Surcol" 860 carboxylated acrylic resin 100% NVS | 4.4 | 4.7 |
| Phthalocyanine blue pigment paste (as used in Example 1(a).) | 0.9 | 0.9 |
|  | 100.0 | 100.0 | and was made by dissolving, with stirring, the "Surcol" 860 in the cold "Lutofan" 200D emulsion, with the addition of volatile amine to maintain pH at 8–9.0. The blue pigment paste was added with stirring.

The viscosity was adjusted with "Viscalex" HN30 as in (a).

When printed under the same conditions and on the same substrates as (a) good results were obtained and wash-up of the screen and equipment with soapy water was quick and easy.

We claim:

1. A process of printing onto a substrate which comprises the steps:
(a) taking an aqueous printing composition which comprises
(i) 30–70% by volume, based on the total volume of the composition, of particles of a primary polymer (A) having a minimum film-forming temperature of not less than 25° C. and selected from the group and consisting of homopolymers and copolymers of vinyl chloride, vinylidene chloride, methyl methacrylate, or vinyl acetate,
(ii) 1.5–33% by weight, based on the weight of the primary polymer (A) of a secondary polymer (B) which is present as an aqueous solution or as a dispersion in which the disperse particles have a minimum film-forming temperature less than 25° C. and selected from the group consisting of alkyd resins, acrylic resins, polyurethane-containing resins, shellacs, modified cellulose, starches, proteins and hydrolyzed polyvinyl acetate,
(iii) 70–30% by volume, based on the total volume of the composition, of an aqueous phase comprising water or a mixture of water and a water-miscible organic solvent; and
(iv) optionally, a pigment or other colourant;
(b) applying the aqueous composition to a substrate by a printing process at a temperature lower than the minimum film-forming temperature of the primary polymer (A) and greater than the minimum film-forming temperature of the secondary polymer (B) when (B) is present as a dispersion; and
(c) thereafter raising the temperature of the printed substrate to a temperature at lease equal to the minimum film-forming temperature of the primary polymer (A).

2. A process according to claim 1 wherein the substrate is a polymeric substrate.

3. A process according to claim 1 wherein the printing composition is applied to the substrate by a printing process selected from rotary gravure, flexography, flat bed screen or rotary screen printing.

* * * * *